United States Patent
James et al.

(10) Patent No.: US 7,246,063 B2
(45) Date of Patent: Jul. 17, 2007

(54) ADAPTING A USER INTERFACE FOR VOICE CONTROL

(75) Inventors: Frankie James, Sunnyvale, CA (US); Jeff Roelands, San Jose, CA (US); Rama Gurram, Cupertino, CA (US); Richard Swan, Portola Valley, CA (US)

(73) Assignee: SAP Aktiengesellschaft, Walldorf (DE)

( * ) Notice: Subject to any disclaimer, the term of this patent is extended or adjusted under 35 U.S.C. 154(b) by 0 days.

(21) Appl. No.: 10/184,072

(22) Filed: Jun. 28, 2002

(65) Prior Publication Data

US 2003/0156130 A1 Aug. 21, 2003

Related U.S. Application Data

(60) Provisional application No. 60/356,746, filed on Feb. 15, 2002.

(51) Int. Cl.
*G10L 21/00* (2006.01)

(52) U.S. Cl. .................... 704/270.1; 704/275

(58) Field of Classification Search ............ 704/270.1, 704/258, 235, 275, 257, 270, 251; 715/513; 345/746

See application file for complete search history.

(56) References Cited

U.S. PATENT DOCUMENTS

| | | | |
|---|---|---|---|
| 5,619,708 A | 4/1997 | Ho ................................. 395/767 |
| 5,884,262 A * | 3/1999 | Wise et al. ............... 704/270.1 |
| 6,012,030 A * | 1/2000 | French-St. George et al. ............................ 704/275 |
| 6,108,629 A * | 8/2000 | Kasday ........................ 704/258 |
| 6,125,376 A * | 9/2000 | Klarlund et al. ............ 715/513 |
| 6,175,820 B1 * | 1/2001 | Dietz ........................... 704/235 |
| 6,434,524 B1 * | 8/2002 | Weber .......................... 704/257 |
| 6,791,529 B2 * | 9/2004 | Shteyn ........................ 345/156 |
| 2001/0043234 A1* | 11/2001 | Kotamarti .................. 345/746 |

FOREIGN PATENT DOCUMENTS

GB EP000878948 A2 * 11/1998
JP 2002-023996 * 1/2002

OTHER PUBLICATIONS

VoiceAssist™ (VoiceAssist™ User's Guide, Creative Labs Inc. © 1993).*
JustVoice™ (Voice Recognition for Microsoft® Windows™ 3.1 w/Update Notice 2.2.1, Interactive Products Inc, © 1994).*
Huang et al ("Surfing The Web Using A Telephone Set", 26th Euromicro Conference, Sep. 2000).*
Noon ("ListenUp! Speech Recognition Plugin for Netscape 2.0", published in a public Cornell web page © 1996).*

(Continued)

*Primary Examiner*—Angela Armstrong
(74) *Attorney, Agent, or Firm*—Fish & Richardson P.C.

(57) ABSTRACT

Method and systems to voice-enable a user interface using a voice extension module are provided. A voice extension module includes a preprocessor, a speech recognition engine, and an input handler. The voice extension module receives user interface information, such as, a hypertext markup language (HTML) document, and voice-enables the document so that a user may interact with any user interface elements using voice commands.

31 Claims, 4 Drawing Sheets

OTHER PUBLICATIONS

Edwards et al ("An Architecture For Transforming Graphical Interfaces", Proceedings Of The 7th Annual ACM Symposium On User Interface Software And Technology, Nov. 1994).

White ("Voice Browsing", IEEE Internet Computing, Jan. 2000).

Narayanaswami et al ("An Online Prototype Speech-Enabled Information Access Tool Using Java Speech Application Programming Interface™", Proceedings of the 33rd Southeastern Symposium on System Theory, Mar. 2001).

Higgins et al ("Speech-Enabled SQL Database Applications Using Java™", The Journal of Computing in Small Columnleges, vol. 16 Issue 3, Mar. 2001).

Conversā ("Surf The WEB With Your Voice", Product Packaging © 1998).*

("Plato™ HouseLinc Smartlinc", online screen excerpts, Tom Gillespie © 1997).*

Accessibility™ ("Windows 98® Accessibility Features and Functions", Microsoft® TechNet, Knowledge Base Appendix H, © 1998).*

James et al., "Voice Over Workplace (VoWP): Voice Navigation in a Complex Business GUI," Proceedings of the 5th International ACM Conference on Assistive Technologies, Jul. 2002, pp. 197-204, Jul. 8-10, 2002.

"Dragon Naturally Speaking 5," Dragon Naturally Speaking User's Guide, Learnout and Hauspie, Be, Oct. 2000, pp. I-VI, 1, XP001233871.

Chung-Ming Huang et al., "Surfing the Web Using a Telephone Set," Sep. 5, 2000, Euromicro Conference, 2000, Proceedings of the 26th Sep. 5-7, 2000, Los Alamitos, CA, USA, IEEE Comput. Soc., US, pp. 126-133, XP010514235.

Foley et al, "Computer Graphics, Principles and Practice," 1996, Addison-Wesley, pp. XVI-XXIII, 347-433, Reading, US, XP002397338.

Supplementary European Search Report for Application EP 03 71 1055, mailed Sep. 18, 2006, 4 pages.

* cited by examiner

ADAPTING A USER INTERFACE FOR VOICE CONTROL

CROSS-REFERENCE TO RELATED APPLICATIONS

This application claims priority from U.S. Provisional Application No. 60/356,746, filed Feb. 15, 2002, and titled VOICE CONTROLLED INTERFACE FOR WEB PORTALS, which is hereby incorporated by reference in its entirety for all purposes.

TECHNICAL FIELD

This invention is directed to a voice-controlled user interface.

BACKGROUND

Much of software used in business today takes the form of complex graphical user interfaces (GUIs). Complex GUIs allow users to perform many tasks simultaneously while maintaining the context of the rest of their work; however, such systems are often mouse- and keyboard-intensive, which can be problematic or even impossible to use for many people, including those with physical disabilities. Voice interfaces can provide an accessible solution for physically disabled users, if steps are taken to address inherent usability problems, such as user efficiency and ambiguity handling. Additionally, voice interfaces may increase the efficiency of performing certain tasks.

Large resources have been expended to develop web-based applications to provide portable, platform-independent front ends to complex business applications using, for example, the hypertext markup language (HTML) and/or JavaScript™.

Because software applications have typically been developed with only the visual presentation in mind, little attention has been given to details that would facilitate the development of voice interfaces.

In most computer or data processing systems, user interaction is provided using only a video display, a keyboard, and a mouse. Additional input and output peripherals are sometimes used, such as printers, plotters, light pens, touch screens, and bar code scanners; however, the vast majority of computer interaction occurs with only the video display, keyboard, and mouse. Thus, primary human-computer interaction is provided through visual display and mechanical actuation. In contrast, a significant proportion of human interaction is verbal. It is desirable to facilitate verbal human-computer interaction to increase access for disabled users and to increase the efficiency of user interfaces.

Various technologies have been developed to provide some form of verbal human-computer interactions, ranging from simple text-to-speech voice synthesis applications to more complex dictation and command-and-control applications. The various types of verbal computer-human interaction applications may be described by two factors: (1) the presence or absence of a visual component; and (2) the extent to which the underlying application and interaction is changed when a voice interface is added.

Many research organizations building verbal human-computer interaction systems focus on the second factor: creating new interaction styles that may be used in conjunction with or in lieu of a visual display. For example, various organizations have created the following systems: CommandTalk; ATIS; TOOT; and ELVIS. Each of these systems focuses on providing improved models for verbal human-computer interaction, fundamentally changing the interaction style. For example, CommandTalk maintains a traditional GUI, while fundamentally changing the interaction style to improve usability. ATIS, an air travel information system, maintains a traditional visual component by presenting answers to user queries in a visual tabular format; however, ATIS modifies conventional interaction styles, moving from a database query interface to a natural language query interface. Similarly, TOOT, a train schedule information system, attempts to present tabular data to users; however, TOOT provides the tabular data by voice, eliminating the need for a visual component. Finally, the ELVIS system for accessing email messages by voice has been tested with several interaction styles, which differ from the visual interaction to varying degrees. The system-initiative style makes use of many of the same command names found in the visual interface, while providing a mixed-initiative style significantly changes conventional interactions.

Many commercial systems tend to maintain conventional interaction styles with varying degrees of visual components. Windows access tools such as ViaVoice™ and SUITEKeys mirror the keyboard/mouse interaction to a greater degree than any of the dialogue systems mentioned above. SUITEKeys even goes so far as to directly mimic the interaction of moving the mouse by hand and pressing individual keys. Similarly, many telephony applications mimic the keypad interaction directly with interactions that take the form of "press or say 1."

Enormous resources have been used to develop business applications requiring complex GUIs to present large quantities of information, display complicated interactions within the information, and manage the complexity of maximizing user capability, configuration, and control. Existing applications provide limited support for controlling an application using voice. Some existing systems allow dictation or limited access commands; however, there is a need for systems and techniques to increase the extent of verbal human-computer interaction in conventional and legacy application to provide increased accessibility for disabled users and increased efficiency of interaction for all users.

SUMMARY

In one general aspect, a method to voice-enable a user interface using a voice extension module is provided. The method includes receiving user interface information, parsing the user interface information to determine user interface elements, and processing the user interface elements to enable voice control. The user interface information may be a hypertext markup language (HTML) document and may include JavaScript™ code. User interface data elements may include, for example, a text field, a selection list, a scroll bar, a slider, a radio button, a checkbox, an icon, or a button. In some implementations, processing the user interface elements includes registering the name and/or type of each user interface element with a speech recognition engine.

In another general aspect, a voice extension module for voice-enabling a user interface is provided. The voice extension module includes a speech recognition engine, a preprocessor that receives user interface information and registers corresponding voice commands with the speech recognition engine, and an input handler that receives and processes user interactions. The preprocessor may include a parser to identify user interface elements, and a translator to register an appropriate vocabulary with the speech recognition engine and retain references to the user interface elements.

In another general aspect, a system for voice-enabling user interfaces includes a browser that generates a user interface corresponding to user interface information, and a voice extension module. The voice extension module includes a speech recognition engine, a preprocessor that receives user interface information and registers corresponding voice commands with the speech recognition engine, and an input handler that receives and processes user interactions. The voice extension module may implemented as a component of the browser.

The details of one or more implementations are set forth in the accompanying drawings and the description below. Other features and advantages will be apparent from the description and drawings, and from the claims.

DETAILED DESCRIPTION

In the last few years, many computer and data processing applications have been created with web-based GUIs. The system described below allows conventional applications with web-based GUIs to be voice-enabled without requiring significant modification to the applications by using a voice extension module.

Figure 1:
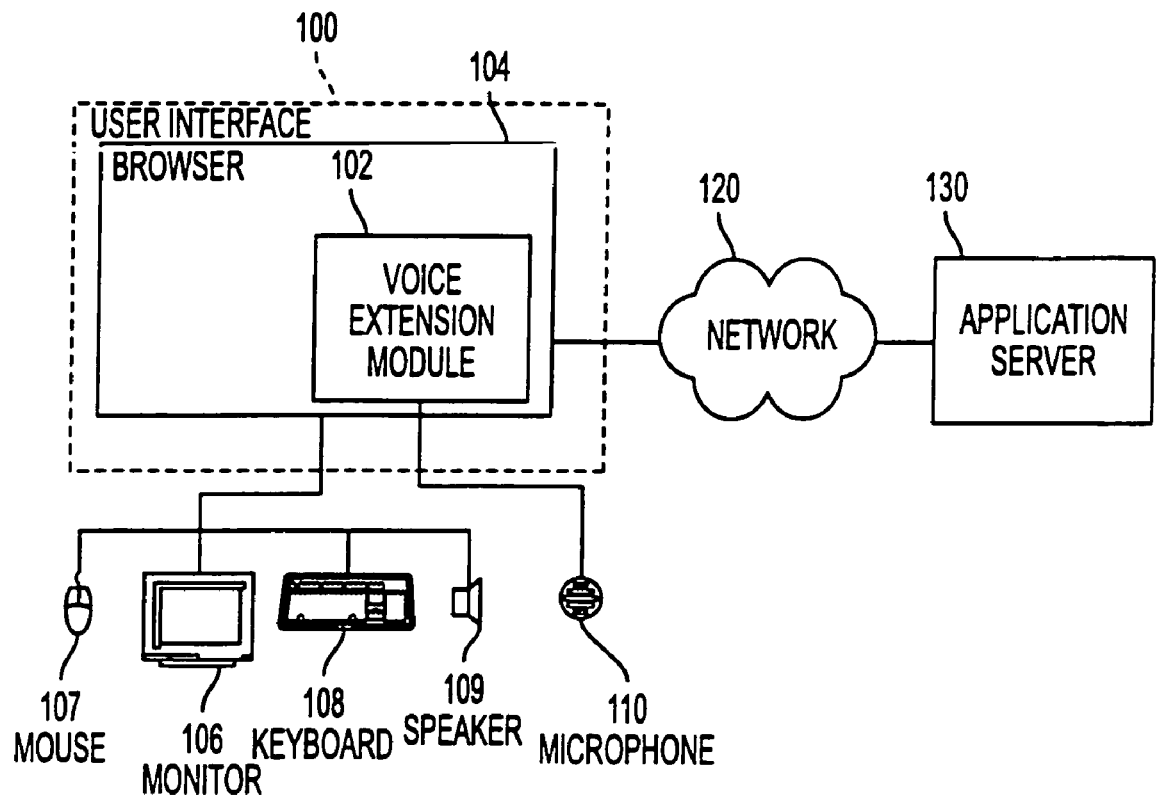
FIG. 1 is a block diagram of a voice-enabled computer application using a voice extension module.

Referring to FIG. 1, a voice-enabled computer interface 100 includes a voice extension module 102 and a browser 104. The browser implements the user input and output 20 functionality, for example, using the following devices: a video display monitor 106; a mouse 107; a keyboard 108; a speaker 109; and a microphone 110. Voice extension module 102 receives user interface data across a network 120 (e.g., the Internet) from an application server 130.

In the implementation shown in FIG. 1, application server 130 provides a web-enabled user interface using Hypertext Markup Language (HTML) code to instruct browser 104 to display information and accept user input and commands. Browser 104 may be implemented using a conventional web browser, such as Microsoft Internet Explorer. Application server 130 sends HTML code describing various text, images, and user interface widgets to be displayed to the user. The HTML code, however, is first received and processed by voice extension module 102 to make the application voice-enabled as described below with reference to FIG. 3.

A voice extension module 102 may be implemented as a Microsoft® Internet Explorer™ Browser Helper Object (BHO). A BHO acts as an extension of functionality to a browser and is used to intercept page and browser events before action is taken. This allows the voice extension module 102 to define and control the behavior of the browser 104 environment and the way in which events (e.g., mouse clicks, key presses) are handled. In addition, a BHO allows the voice extension module 102 to respond to external events, such as when a word is spoken, by embedding a speech recognition engine into the BHO. In this implementation, any SAPI-compliant speech recognition engine may be used to generate speech recognition events.

Figure 2:
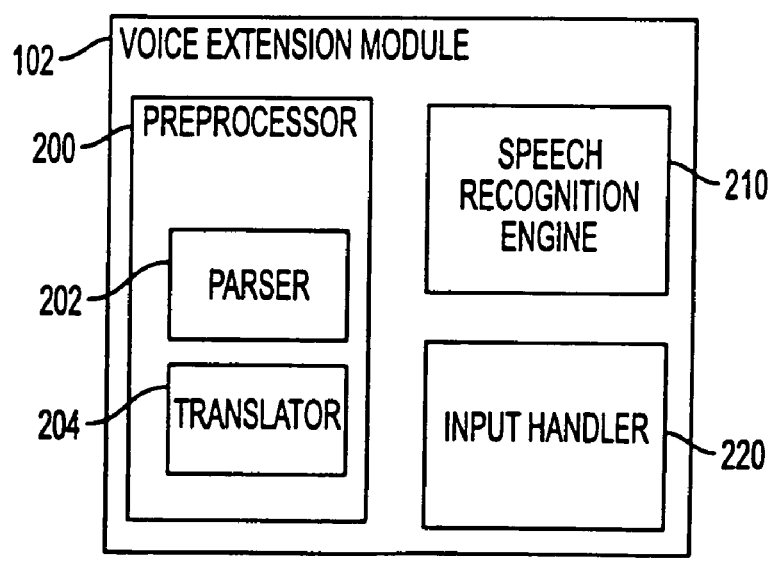
FIG. 2 is a block diagram of a voice extension module having a preprocessor, speech recognition engine, and input handler.

As shown in FIG. 2, one implementation of voice extension module 102 includes a preprocessor 200 that receives user interface information from an application server 130, for example, as HTML or JavaScript™ code, and preprocesses the user interface information to enable voice interaction before the page is displayed to the user. The preprocessor 200 includes a parser 202 and a translator 204. The parser 202 identifies user interface elements within the code using any conventional parsing techniques, such as, a finite state machine.

For example, user interface information in the form of an HTML web page may include various widgets in the form of text fields, password fields, checkboxes, radio buttons, and control buttons (e.g., submit and reset). The parser 202 receives the user interface information and passes it to the translator 204 to properly register the relevant vocabulary with the speech recognition engine 210 and the input handler 220.

The translator 204 determines which of the identified user interface elements are "speakable." A vocabulary of speakable items is registered with the speech recognition engine 210 so that appropriate events are generated when the items are spoken. Additional changes may be made to the HTML or JavaScript™ running within the browser 104 before it is presented to the user, in order to make the pages more "voice-friendly." For example, translator 204 may add identifiers to elements. Some elements may include XML data or other metadata that indicates an appropriate voice identifier for the element. This metadata may determine an appropriate identifier that may be added to the element to make it more voice-friendly. Additionally, some identifiers may be abbreviated. For elements containing abbreviated identifiers, translator 204 may register the abbreviated identifier, the long form of the identifier, or both with the speech recognition engine 210. Finally, translator 204 may attempt to shorten long identifiers. One way to shorten long identifiers is to register only a portion of the long identifier. For example, if the identifier is "Submit Changes for Processing," it can be shortened to "Submit" or "Submit Changes."

Once a registered vocabulary item is spoken and recognized, the phrase is sent to input handler 220 which takes the appropriate steps to complete the action, save any necessary state, and perform additional tasks as defined by the behavior of the voice user interface or visual focusing used in the overall voice interface strategy. The input handler 220 helps to ensure that the same action is taken regardless of whether the source was the mouse or keyboard, or an equivalent voice command.

Figure 3:
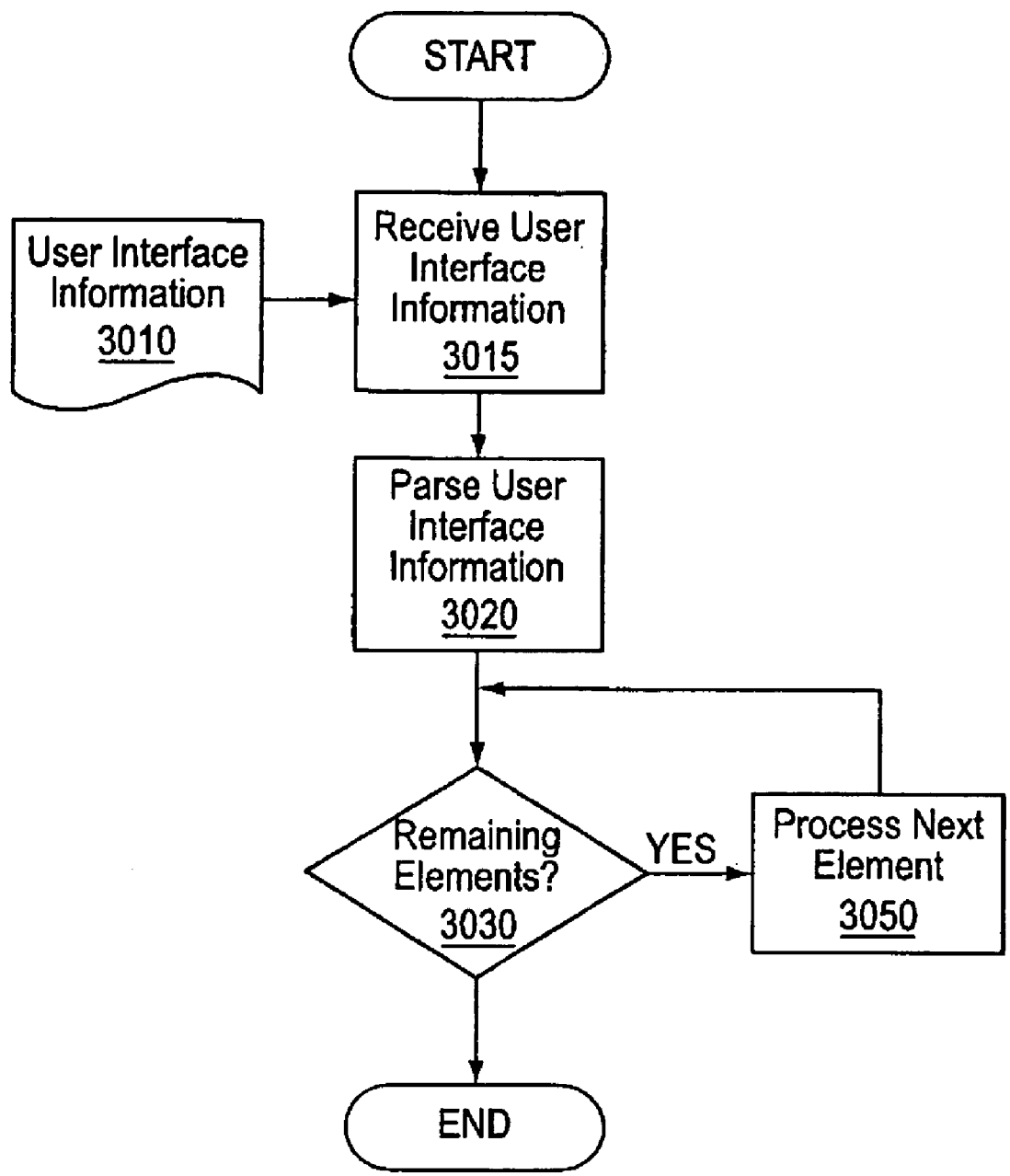
FIG. 3 is a flowchart showing a method of processing user interface information in a voice extension module.

Referring to FIG. 3, voice extension module 102 makes a user interface voice-enabled by first receiving user interface information 3010 describing the components of the interface manipulable by a user (step 3015). In this implementation, user interface information 3010 is represented as an HTML document that may include various user interface elements or widgets that may be controlled by a user. The user interface information 3010 also may include JavaScript™ code or any other control mechanism conventionally used by web browsers.

The user interface information 3010 is received by voice extension module 102 and then processed by preprocessor 200. The preprocessor 200 parses the received user interface information 3010 using parser 202 (step 3020). For each user interface element identified by parser 202, translator 204 processes the element to make it voice-enabled. As long as user interface elements are remaining (step 3030), the system processes the next element (step 3050). Once each user interface element has been processed, the user interface is displayed by the browser 104. Translator 204 processes each user interface element by registering appropriate vocabulary with the speech recognition engine 210 and by registering the user interface elements with input handler 220.

For example, the following user interface element may be received by voice extension module 102: "<INPUT TYPE='button' NAME='but_xyz' VALUE='save changes'>". This user interface element displays a button allowing a user to initiate saving changes. The translator 204 processes this element by registering "SAVE CHANGES" with the speech recognition engine 210. This would also be registered with the input handler 220 as a button field so that a user may access the field by stating "BUTTON." The input handler, receiving a button request, identifies all active buttons, allowing the user to select the desired button by number. This allows an alternate technique to access a named button element; however, this technique may be the only way to access unnamed button elements.

Data entry tasks incorporate many elements (or widgets) that require user control. Data entry is usually handled using a mouse and/or keyboard, and the intended target is generally easy to determine through the physical interaction component of the pointing device. In a voice interface, other focusing and selection techniques must typically be used to determine potential targets.

Many data widgets within applications, such as scroll bars, buttons, and text fields either do not have names (e.g., because they are associated with a particular unnamed table or row), have ambiguous names (e.g., because there is more than one field labeled as "ID number"), or appear to have names in the visual display, but are not easily associated with those names by the code, because the text appears in a completely different module from the widget.

One technique is to use implicit navigation in conjunction with a generic method for addressing data entry widgets. Implicit navigation is described in the following publication: James, F. and Roelands, J., Voice over Workplace (VoWP): Voice Navigation in a Complex Business GUI. *ASSETS* 2002, (Edinburgh, Scotland, 2002). Briefly, implicit navigation prioritizes screen areas to minimize the potential for ambiguity. A user interface screen may be divided into several areas that are prioritized. User interactions and screen updates modify the prioritization to make user interfaces more voice-friendly.

Generic access to interface elements is provided by addressing elements by type. For example, to reach a text field in a given application, a user simply says "text field." If there is more than one text field in the current focus area, this is treated as any other ambiguity; overlaid labels are presented to allow the user to select the intended target. Although this approach makes most element selection into a two-step process, it does allow the user to navigate to any element on the screen efficiently. Items that can be accessed by name (such as buttons) also may be accessed using this generic method, to ensure interface consistency and allow for alternatives in the case of degraded recognition performance.

Once an item has been selected, if it is an icon, button, radio button, or check box, the interface behaves as though the item has been clicked with the mouse. For combo boxes, the options in the list are displayed so that the user can make a selection. Text fields are highlighted with a colored border and the active cursor is placed in them, to signal that the user has entered dictation mode for that field.

An alternative solution to the unnamed element problem is to add unique names to all the elements when the page is first presented to the user, rather than requiring the user to first say the element type to cause the numbered overlaid labels to appear.

One problem associated with voice interfaces is distinguishing data entry from commands. For example, when a user selects a multi-line text field, it can be assumed that the user wishes to enter dictation mode and input some text. However, a technique to determine when that input is finished and the user is ready to resume navigation is needed. This may be accomplished in many ways.

For example, one option is to use an explicit command to end data entry. This requires the use of a code word or phrase, such as, "end dictation." For multi-line text fields where the user will want to have full edit control, this may be the best solution since large dictation tasks of this nature would then be treated as a separate mode that has to be manually exited.

A variant of this idea is to have the system listen for multiple keywords, such as the names of other targets in the interface. One way to accomplish this is to employ multiple parallel recognizers, with each recognizer listening for different keywords. This technique, however, increases the chance of misinterpreting dictation as a command and prematurely exiting dictation mode.

Similarly, a pause or timeout may be used to end dictation. Unfortunately this technique is often difficult for users because the end of dictation may be triggered by simply pausing to think about what to say next. This technique may be made more usable by providing visual cues to users.

Another option is to assign appropriate grammars to fields, to eliminate the need for dictation whenever possible. This technique is useful in situations where the field is expecting something specific, such as a date. However, it requires a way to determine the field's expected data type and assign a suitable grammar, potentially from a pool of common grammars. Then, the system can automatically set the interface to expect to hear a particular type of entry once the field is selected, and return to the standard control mode once an entry is made. A recognition grammar for a particular text field also may be chosen at run-time by the user using a method of "sticky defaults." For example, the first time a user encounters a field, he can specify that a date grammar should be used. Then, on subsequent accesses of that field (even during different sessions), the system can default to the date grammar.

Regardless of the method used to determine when input will end, visual cues may be used to indicate to the user what mode he or she is in. For example, a blue border may be placed around the text field once it has been selected to indicate to the user that the system is expecting an entry for that field. Not only does this confirm the user's selection of a particular field, it also reminds the user that he or she must supply data for the field as the next action.

Figure 4:
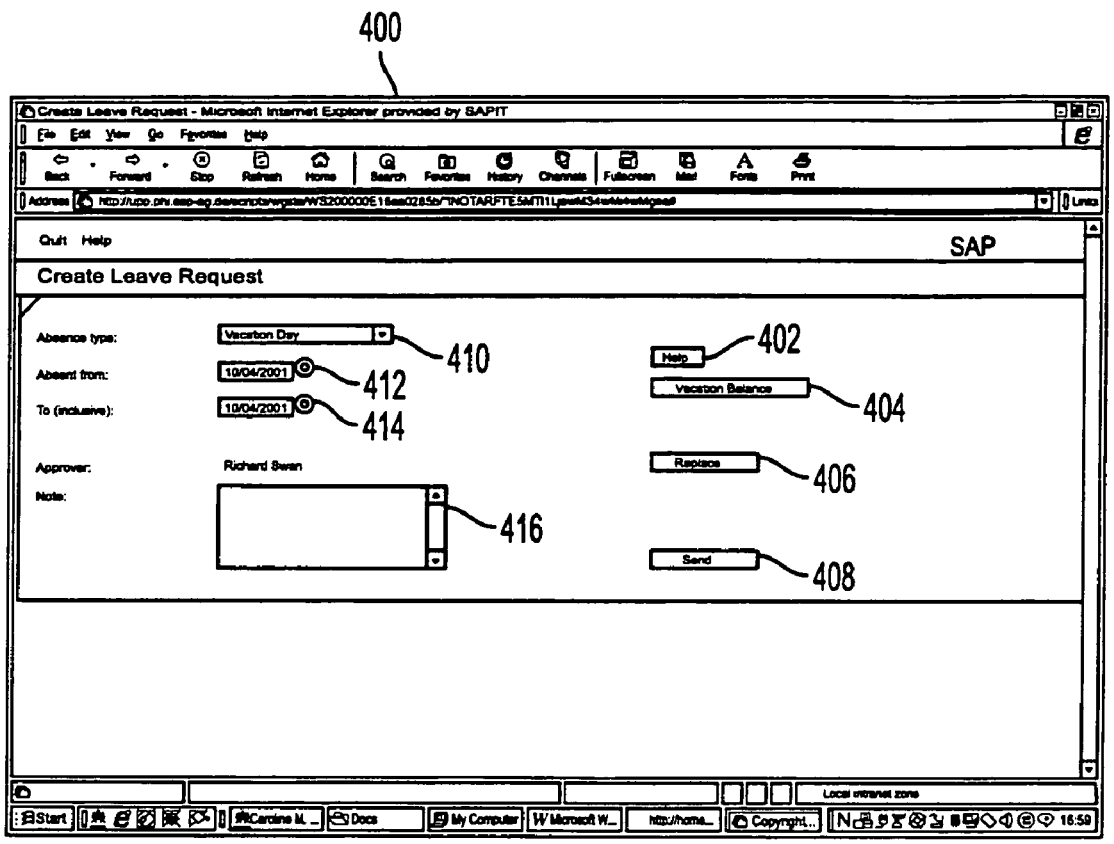
FIG. 4 is a screenshot showing a leave request application.

FIG. 4 illustrates an exemplary business application user interface to a leave request application using the techniques described above. The buttons on screen 400 (help button 402, vacation balance button 404, replace button 406, and send button 408) may be activated by speaking their names. Ideally, the remaining user interface elements also would be accessible by stating their names; however, it is often difficult or impossible to associate the appropriate text with the interface element. For example, remaining fields (absence type field 410, absent from field 412, absent to field 414, and note field 416) may include embedded labels or names that differ from text placed near the fields. The note field 416, for example, may be defined using the following HTML code: "<TEXTAREA NAME='ABNOTE' ROWS=4 COLS=20>". Sometimes it is not possible to associate a field with a label on the screen just by parsing HTML code. For example, it would be difficult for the system to associate the "Note" text with note field 416. In such cases, the creator of the web page can include XML or other metadata so that the system can determine an appropriate voice identifier for the field.

The absence type field 410 uses a drop-down (selection) list for data entry. To focus on this particular item, the user says "selection list." This in general will number all selection lists with transparent overlays to allow user selection. Since there is only one selection list in this screen, focus is automatically moved to it. The list is highlighted and the available choices are displayed. The default will be for the system to interpret the next command as an option from the list.

The absent from field 412 and absent to field 414 are both basically free-text entry fields that have associated info buttons allowing selection from another widget, in this case, a calendar. If the user wants to enter text into these fields, he can say "text entry." This will cause transparent overlays (that include an identifiable character or number) to be displayed for all three text entry fields: the two text entry fields related to dates and also the text entry field for notes. The user selects a number to choose the desired field. At this point, the text entry field will be in focus and the user can dictate in the appropriate date.

The note field 416 may be similarly activated using voice commands; however, the text area also includes a scroll bar. Thus, when note field 416 is activated, a scroll bar voice command is available allowing the user to scroll up and down within the user interface element.

Figure 5:
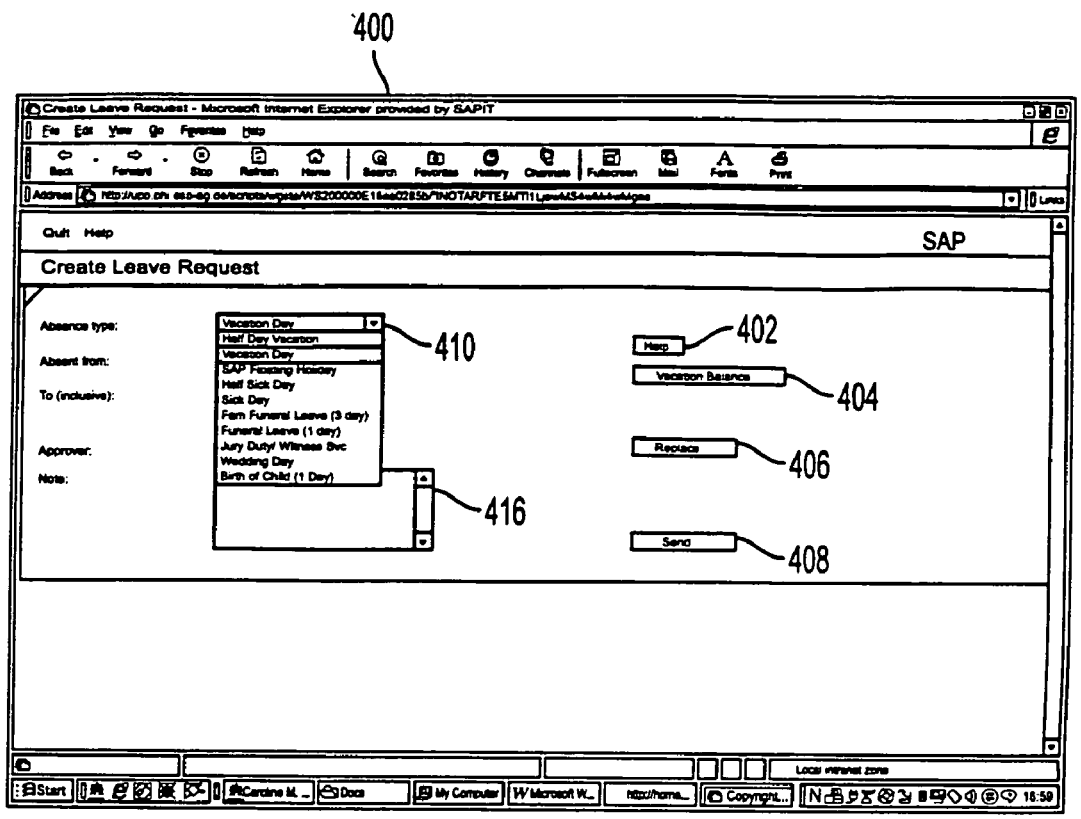
FIG. 5 is a screenshot showing a leave request application illustrating list selection.

FIG. 5 illustrates screen 400 after the user says "selection list." The field is activated with a visual cue, in this case, a blue box surrounding the field, and the available options are shown to the user. The user may then select an option by reading the displayed text. For example, the user may say "wedding day" or "sick day" to select the corresponding option.

The user may then enter dates in the absent from field 412 and absent to field 414 by saying "text entry." This causes the three text entry fields to be highlighted on the screen so that the user may then select the desired text entry field. For example, the system may place a transparent overlay on the three text entry fields, with each overlay indicating a number. The user may then read the number to select the desired field.

The user may interact with the system to enter a date by saying "text box" and then "1" to shift the focus to the "absent from" field 412. Then, the user may indicate the date by saying "10 04 2001." The speech recognition engine 210 may use a date recognition grammar registered by translator 204 to recognize voice input. The translator 204 then formats the recognized numbers in the appropriate date format for use by the application.

A number of implementations have been described. Nevertheless, it will be understood that various modifications may be made without departing from the spirit and scope of the invention. Accordingly, other implementations are within the scope of the following claims.

What is claimed is:

1. A method to voice-enable a user interface using a voice extension module comprising:
receiving user interface information;
parsing the user interface information to determine user interface elements, the user interface elements being configured to accept user input or control;
processing the user interface elements to enable voice control;
receiving a voice control to identify a user interface element from among the user interface elements, the user interface element to be a focus for future voice input;
displaying visual feedback identifying the user interface element as a focus for future voice input in response to the voice control, wherein the visual feedback identifying the user interface element is associated positionally with and is supplemental to the user interface element;
receiving voice input directed to the user interface element; and
displaying visual feedback corresponding to the voice input, wherein the visual feedback corresponding to the voice input is associated positionally with and is supplemental to the user interface element.

2. The method of claim 1 wherein the user interface information is a hypertext markup language (HTML) document.

3. The method of claim 2 wherein the HTML document includes code to enable dynamic content.

4. The method of claim 1 wherein user interface elements include one or more from the group consisting of:
a text field;
a selection list;
a scroll bar;
a slider;
a radio button;
a checkbox;
an icon; and
a button.

5. The method of claim 1 wherein processing the user interface elements includes:
for each user interface element, registering the user interface element with a speech recognition engine.

6. The method of claim 5 wherein registering the user interface element with a speech recognition engine includes registering the name of the user interface element.

7. The method of claim 5 wherein registering the user interface element with a speech recognition engine includes registering the type of the user interface element.

8. The method of claim 5 wherein processing the user interface elements further comprises enabling a user to specify a grammar to be associated with at least one of the user interface elements.

9. The method of claim 1 further comprising receiving input corresponding to the user interface elements.

10. The method of claim 9 wherein the user input is voice input recognized by a speech recognition engine.

11. The method of claim 9 wherein the input includes data obtained from one or more of the following devices:
a keyboard;
a mouse; and
a microphone.

12. The method of claim 1 wherein displaying visual feedback further comprises visually highlighting at least one of the user interface elements based on a correspondence to the voice control.

13. The method of claim 12 wherein visually highlighting at least one of the user interface elements comprises visually highlighting at least one of the user interface elements with a colored border.

14. The method of claim 12 wherein visually highlighting at least one of the user interface elements comprises visually highlighting at least one of the user interface elements with an overlaid label.

15. The method of claim 1 wherein displaying visual feedback comprises altering the user interface information to display the visual feedback.

16. A computer readable medium encoded with a voice extension module for voice-enabling a user interface wherein the voice extension module comprises:
   a speech recognition engine;
   a preprocessor that receives user interface information, registers corresponding voice commands with the speech recognition engine, and enables visual feedback; and
   an input handler configured to:
      receive a voice control to identify a user interface element to be a focus for future voice input and to communicate with the preprocessor in order to display visual feedback identifying the user interface element as a focus for future voice input in response to the voice control, wherein the visual feedback identifying the user interface element is associated positionally with and is supplemental to the user interface element, and,
      receive voice input directed to the user interface element and to communicate with the preprocessor in order to display visual feedback corresponding to the voice input, wherein the visual feedback corresponding to the voice input is associated positionally with and is supplemental to the user interface element.

17. The voice extension module of claim 16 wherein the preprocessor comprises:
   a parser to identify the user interface element; and
   a translator to voice-enable the user interface element.

18. The voice extension module of claim 17 wherein the user interface elements include one or more from the group consisting of:
   a text field;
   a selection list;
   a scroll bar;
   a slider;
   a radio button;
   a checkbox;
   an icon; and
   a button.

19. The voice extension module of claim 16 wherein the preprocessor enables visual feedback by enabling the user interface element to be highlighted visually based on a correspondence to the voice control.

20. The voice extension module of claim 16 wherein the preprocessor alters the user interface information to enable the visual feedback.

21. The voice extension module of claim 16 wherein the input handler enables a user to specify a grammar to be associated with the user interface element.

22. A system for voice-enabling user interfaces comprising:
   a browser that generates a user interface corresponding to user interface information; and
   a voice extension module associated with the browser and operable to voice-enable the user interface generated by the browser, the voice extension module including:
      a speech recognition engine;
      a preprocessor that receives the user interface information, registers corresponding voice commands with the speech recognition engine, and enables visual feedback; and
      an input handler configured to:
         receive a voice control to identify a user interface element to be a focus for future voice input and to communicate with the preprocessor in order to display visual feedback identifying the user interface element as a focus for future voice input in response to the voice control, wherein the visual feedback identifying the user interface element is associated positionally with and is supplemental to the user interface element, and
         receive voice input directed to the user interface element and to communicate with the preprocessor in order to display visual feedback corresponding to the voice input, wherein the visual feedback corresponding to the voice input is associated positionally with and is supplemental to the user interface element.

23. The system of claim 22 wherein the browser is Internet Explorer™.

24. The system of claim 22 further comprising an output device for presenting the user interface including one or more from the group consisting of:
   a monitor;
   a speaker; and
   a liquid crystal display (LCD) panel.

25. The system of claim 22 wherein the user interface information is a hypertext markup language (HTML) document.

26. The system of claim 25 wherein the preprocessor comprises:
   a parser to identify the user interface element; and
   a translator to voice-enable the user interface element.

27. The system of claim 26 wherein the user interface elements include one or more from the group consisting of:
   a text field;
   a selection list;
   a scroll bar;
   a slider;
   a radio button;
   a checkbox;
   an icon; and
   a button.

28. The system of claim 22 wherein the voice extension module is a component of the browser.

29. The system of claim 22 wherein the preprocessor enables visual feedback by enabling the user interface element to be highlighted visually based on a correspondence to the voice control.

30. The system of claim 22 wherein the preprocessor alters the user interface information to enable the visual feedback before the browser generates the user interface corresponding to the user interface information.

31. The system of claim 22 wherein the input handler enables a user to specify a grammar to be associated with the user interface element.

* * * * *